Figure 2:
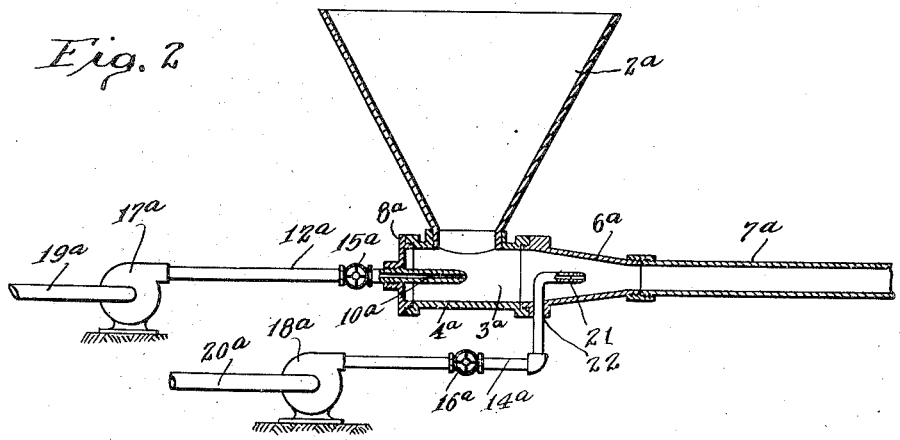

Nov. 15, 1927. 1,649,062

E. P. HALLIBURTON

APPARATUS FOR MIXING AND PROPORTIONING MATERIALS

Filed Sept. 16, 1926

Inventor
Erle P. Halliburton
By
Lyon & Lyon
Attorneys

Patented Nov. 15, 1927.

1,649,062

UNITED STATES PATENT OFFICE.

ERLE PALMER HALLIBURTON, OF LOS ANGELES, CALIFORNIA.

APPARATUS FOR MIXING AND PROPORTIONING MATERIALS.

Application filed September 16, 1926. Serial No. 135,802.

This invention relates to an apparatus for mixing solid materials with liquids, and refers particularly to an apparatus for mixing solid materials with liquids when it is desired to rapidly form the mixture and deliver the same from the mixing zone.

The present invention has particular value in mixing materials together which form a mixture of unstable composition such as a mixture of cementing materials, which mixture operates to set, or a mixture of chemical ingredients which operate to combine together after their admixture and must be used immediately after mixing. As an example of the last class of materials, the invention is adapted for the production of fire quenching materials, particularly of the foam type in which different solids and liquids are added together which, at the time of mixing, rapidly form a large body of foam, which for use must be immediately and rapidly removed from the mixing zone.

Another example of the character of mixed materials which the invention is particularly adapted to produce is mixtures of cementing materials such as cement, water, and a quick hardening solution, or cement, water, and diatomaceous earth or other like materials which are unstable after being admixed and should be rapidly transported to the place of use.

A particular object of the present invention is to provide an apparatus for mixing the above type of materials which is adapted to provide not only for the rapid mixing of the materials, continually supplying the materials to the mixing zone, and the rapid removal of the materials from the mixing zone, but is also adapted to supply the materials in carefully measured or regulated proportions in order to accurately control the percentages of materials in the formed mixture.

This invention is characterized by the provision of means by which two liquid supplies can be placed under pressure and delivered to the mixing zone and accurately measured in predetermined proportions where said liquids are caused to form one or more high velocity streams together with the depositing of a solid material adjacent said stream or streams, whereby the properly proportioned liquids operate through the formation of the high velocity stream to form a region of suction operative to draw in the correct percentage of the solid material and rapidly admix the same with the liquid and eject the same from the mixing zone. The invention may take different forms, for example, one form in which a supply of a single liquid is formed into two separate high velocity streams and separately passed through two or more deposits of solid material of the same or different kinds so as to provide for the separate ejection of said solid material into a single mixing zone, wherein the total materials are thoroughly admixed together and rapidly ejected to a place of use; or the invention may comprise a form in which a single solid material is fed into a mixing zone by the action of one or more high velocity streams of liquid, which may be formed from two or more separately measured sources of the same or different liquids; or the invention may embody a form in which a plurality of different deposits of solid material of like or different character are acted upon by two or more high velocity streams of liquid of like or different character in which the quantities of the liquids supplied to the streams are positively proportioned so that accurate control is obtained of the entire materials fed into a single mixing zone from which the admixture may be rapidly ejected to a place of use.

This invention, together with various objects and advantages thereof will best be understood from a description of certain preferred apparatus embodying the invention.

Figure 3:
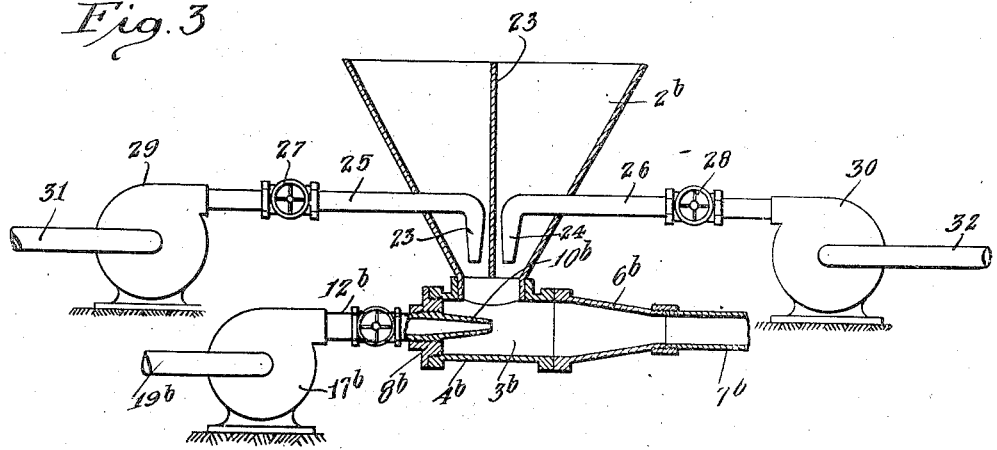
Figure 1:
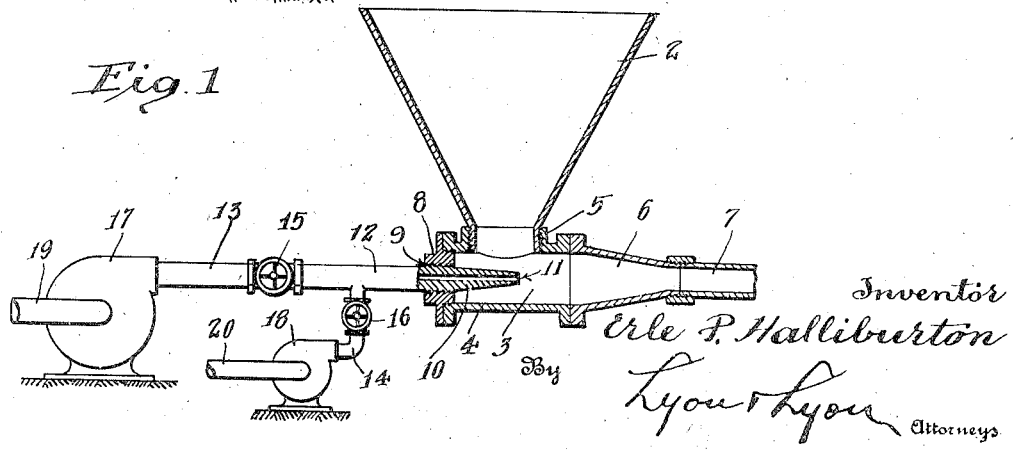

Reference is therefore made to the accompanying drawings, which illustrate preferred examples of apparatus embodying the present invention, in which:

Figure 1 is a somewhat diagrammatic view in elevation and partially in section of a form of apparatus for mixing a single solid material with two or more liquids;

Figure 2 is a similar view of a modified form of an apparatus for mixing a single solid material with two or more liquids in which the separate liquids are supplied to the mixing zone in separate high velocity streams; and Figure 3 is a further modified form of the invention for use where it is desired to mix a plurality of different supplies of solid material with a single or a plurality of liquid supplies.

Referring first to Figure 1 of the drawings, the apparatus there illustrated comprises a hopper 2 of generally frusto-conical shape which communicates at its lower end with a mixing chamber 3. The mixing chamber 3 is formed by a T-pipe 4, having an upstanding annular flange 5 at its lateral opening which may be threaded to the lower end of the hopper 2. The forward end of the T-pipe 4 is attached to a tapered swedge 6 which in turn is coupled to a discharge pipe 7 through which the admixed materials may be passed to the point of use.

The rear end of the T-pipe 4 is provided with a bushing 8 having an opening 9 through which is extended a jet pipe 10, which jet pipe 10 has its outlet 11 positioned so that a high velocity stream of liquid formed thereby can produce a region of suction on the outlet from the hopper 2. The jet pipe 10 is indicated as connected to a supply line 12, which in turn is connected to two branch supply lines 13 and 14, provided respectively with the valves 15 and 16. Said lines 13 and 14 are the outlet lines from pumps 17 and 18, respectively. Said pumping lines 17 and 18 are preferably suitably connected together so that they are necessarily driven at predetermined speed ratios and may constitute separate cylinders of the same pump. Both of the pumping lines 17 and 18 should be of the positive displacement type so that in accordance with a definite relation of speed therebetween, they will positively deliver to their discharge lines 13 and 14, a predetermined ratio of liquids. For example, said pumps may be of the plunger type or the gear type of pumps. The pumps 17 and 18 are indicated as provided with inlet lines 19 and 20, respectively, which may lead to a single source of supply or to supplies of separate liquids.

The apparatus thus described provides an exceptionally efficient means for admixing solid materials with liquids and rapidly ejecting the same to the place of use. For example, in case it is desired to mix hydraulic cement with water and a hardening solution, such as a solution of calcium chlorid, in carefully regulated proportions, the solid material, such as the dry comminuted cement, is placed in the hopper 2 and the pumps 17 and 18 are separately connected to a water supply and a supply of the quick hardening solution. The relative displacement of the pumps 17 and 18 are so designed that in consequence of their interconnection, it will positively draw the correct proportions of water and quick hardening solution and deliver the same to the jet 10. The combined solutions are ejected from the jet 10 in the form of a high velocity stream which provides a region of suction for drawing the cement from the hopper 2 into the mixing chamber 3, wherein the energy of the stream of liquid operates to thoroughly admix the cement with the liquid ingredients and immediately eject the same from the mixing chamber 3 through the swedge 6 to delivery line 7 to the place of use.

Similarly, when for example, it is desired to form a fire fighting foam, a solution of glue, tannin, or other material adapted for forming a tenacious foam, may be supplied to one of the pumps 17 and 18, and an acid supplied to the other pump 18, it being understood that the relative displacements of the pumps should be properly proportioned that said pumps must positively draw in the correct proportions of these liquids, and the hopper 2 may be filled with a carbonate for forming carbon dioxide with the liquid ingredients. In such case, the high velocity stream of liquid discharging from the jet pipe 10 will positively draw the comminuted solid carbonate into the mixing chamber 3 where the same will be thoroughly admixed with the liquid materials and be rapidly ejected therefrom through the delivery line 7 so that the resulting foam formed thereby may be ejected upon the place where it may be needed.

Now, referring to the form of the invention illustrated in Figure 2 of the drawings, this form of the apparatus comprises a hopper $2^a$, the discharge end of which communicates with a mixing chamber $3^a$ formed by a T-pipe $4^a$. The forward end of the T-pipe $4^a$ is connected with a tapered swedge $6^a$ and hence to a discharge line or pipe $7^a$. The rear end of the T-pipe $4^a$ is provided with a bushing $8^a$ through which extends a jet pipe $10^a$ connected by a line $12^a$ having a valve $15^a$ with a pump $17^a$. Said pump $17^a$ is indicated as having an inlet line $19^a$ which leads to a source of liquid supply (not shown). The apparatus is also illustrated as provided with a supplemental jet pipe 21, positioned within the swedge $6^a$ and discharging toward the discharge line $7^a$, said jet pipe 21 entering through the lower side of the mixing chamber, as indicated at 22, and is connected by a line $14^a$ provided with a valve $16^a$ and with a pump $18^a$. Said pump is indicated as having an inlet line $20^a$, but it is understood that it should be connected with the supply of liquid materials (not shown).

The pumps $17^a$ and $18^a$ are likewise to be of the positive displacement type and suitably interconnected together so that the ratio of their relative displacements is constant.

The apparatus thus described may likewise be employed for mixing a single solid material with one or a plurality of liquids. The form of the invention shown in Figure 2 may be employed for various purposes, one liquid being supplied from a pump $17^a$ and another liquid or a separate source of the same liquid being supplied from the pump $18^a$. These two different supplies of liquid will always be passed to the mixing zone 3ª of the apparatus under carefully measured proportions. The liquid supplies will issue from the jet pipes 10ª and 21 in the form of high velocity streams which, through the region of suction formed thereby, will draw in solid material from the hopper 2ª into the mixing zone and thoroughly commingle said solid material with the liquid and eject the same through the pipe 7ª to the point of use.

The form of the invention shown in Figure 3 comprises a means for holding a plurality of deposits of solid material, which means is preferably indicated as provided by a hopper 2ᵇ having a central diaphragm 23 dividing the hopper into two separate compartments discharging from a common outlet at the lower end of the hopper. The hopper is connected with a mixing chamber 3ᵇ formed by a T-pipe 4ᵇ. The T-pipe 4ᵇ connects with a swedge 6ᵇ to a delivery line 7ᵇ. The rear end of the T-pipe 4ᵇ is provided with a bushing 8ᵇ through which extends a jet pipe 10ᵇ. The jet pipe 10ᵇ is indicated as connected through a line 12ᵇ with a pump 17ᵇ having an inlet line 19ᵇ.

There is also preferably provided a jet pipe for each compartment of the hopper 2ᵇ, said jet pipes being indicated at 23 and 24 respectively and are disposed to discharge downwardly through the outlets of said compartments. Said jet pipes are connected respectively to the lines 25 and 26 provided with the valves 27 and 28, respectively. The lines 25 and 26 are respectively connected with the pumps 29 and 30, which are respectively connected with inlet lines 31 and 32. All of the pumps 17ᵇ, 29 and 30 should be of the positive displacement type and positively connected together so that in use the relative amounts of liquid supplied by each pump will be in definitely predetermined ratios.

The apparatus of Figure 3 is designed particularly for use in admixing a plurality of solid materials with a plurality of liquid materials. It is understood that one or more of the jet pipes 10ᵇ, 23ª, or 24 may be omitted, depending upon the character of the mixture desired and the characteristics of the mixed materials. As an example of a process as carried out in the apparatus of Figure 3, when it is desired to form a cementing composition of diatomaceous earth, cement, water or other liquid, such as a quick hardening material, waterproofing solution, or the like, the cement may be placed in one compartment of the hopper 2ᵇ and the diatomaceous earth in comminuted form in the other compartment of the hopper 2ᵇ. The different pumps 17ᵇ, 29 and 30 may all be connected with a single liquid supply, such as water, with the pumps 29 and 30 of the correct relative displacements so as to draw the proper relative proportions of cement and water into the mixing zone, or different liquid supplies may be provided for the different jets such, for example, as providing water to the jet 10ᵇ and a waterproofing solution to both jets 23ª and 24, or a waterproofing solution may be supplied to the jet 23ª, a quick hardening solution to the jet 24, and water or other liquid for forming the cementing material supplied to the jet 10ᵇ.

It is understood that in each of the different forms of the mixing apparatus herein described, the liquids supplied to the different jets may be only semi-fluid and comprise solutions of solid materials therein. As an example of one form of the invention, a previously formed fluid pumpable cement grout may be supplied to the mixing zone from one of the jets for the purpose of enriching said cement grout with cement sand, gravel, or both from the hopper for accurately proportioning or enriching the said cement grout with sand, gravel or both.

It is also understood that in some forms of the invention, for example, in each of the forms herein described, there may be employed jets for discharging into the material after the mixing has been accomplished and preferably at the point where the mixture is to be used, in which case said jet would be supplied with liquid from a pump of the positive action type driven in synchronism with the pump supplying the fluid to the mixing jet.

While I have described the preferred forms of the invention, it is understood that the invention may take other forms, and this invention includes all such modifications, changes and substitutions as come within the scope of the appended claims.

I claim:

1. An apparatus for mixing and proportioning solid with liquid materials comprising a feed hopper for the solid material, a plurality of jet pipes positioned to discharge by the outlet of said feed hopper, a plurality of positive action pumping means connected to the respective jet pipes, and means connecting the pumping means together whereby to positively determine the ratio of liquids pumped thereby.

2. In apparatus for mixing solid materials with liquids which comprises a plurality of separate means for containing solid material, a mixing chamber into which said means discharge, at least one jet pipe positioned to discharge by the outlets of said means, and a plurality of positive acting pumping means connected to said jet pipe means, and means for positively connecting said pumping means together whereby said pumping means will draw liquids in predetermined proportions.

3. A mixer for admixing solid with liquid materials comprising a plurality of containers for holding different solid materials, a mixing chamber into which said containers discharge, a plurality of jet pipe means positioned to discharge by the outlets of said containers to draw solid material into said mixing chamber, a plurality of positive acting pumping means connected to said jet pipe means, and means interconnecting said positive acting pumping means whereby the liquids pumped thereby will be in predetermined ratios.

Signed at Los Angeles, California, this 2nd day of August, 1926.

ERLE PALMER HALLIBURTON.